(12) United States Patent
Yamamoto et al.

(10) Patent No.: US 8,737,794 B2
(45) Date of Patent: May 27, 2014

(54) TWO-LAYER OPTICAL WAVEGUIDE AND METHOD OF MANUFACTURING THE SAME

(75) Inventors: Kazunao Yamamoto, Nagano (JP); Hideki Yonekura, Nagano (JP); Kenji Yanagisawa, Nagano (JP); Takanori Yamamoto, Nagano (JP)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 130 days.

(21) Appl. No.: 13/325,456

(22) Filed: Dec. 14, 2011

(65) Prior Publication Data

US 2012/0155823 A1     Jun. 21, 2012

(30) Foreign Application Priority Data

Dec. 20, 2010   (JP) ................................. 2010-282708

(51) Int. Cl.
G02B 6/10     (2006.01)
G02B 6/12     (2006.01)

(52) U.S. Cl.
USPC ............................................ 385/130; 385/14

(58) Field of Classification Search
USPC ........................................................ 385/130
See application file for complete search history.

(56) References Cited

U.S. PATENT DOCUMENTS

| 7,734,124 B2 | 6/2010 | Yonekura et al. |
| 2004/0047539 A1 | 3/2004 | Okubora et al. |
| 2005/0100298 A1 | 5/2005 | Okubora et al. |
| 2009/0080830 A1* | 3/2009 | Matsuoka et al. ............. 385/14 |
| 2009/0188610 A1* | 7/2009 | Yamamoto .................... 156/167 |

FOREIGN PATENT DOCUMENTS

| JP | 2598025 B2 | 4/1997 |
| JP | 2000-199827 | 7/2000 |
| JP | 2000-298221 | 10/2000 |
| JP | 2005-300930 A1 | 10/2005 |
| JP | 2007-031555 | 2/2007 |
| JP | 20081281816 | 11/2008 |

OTHER PUBLICATIONS

Office Action mailed Dec. 3, 2013 from the Japanese Patent Office in counterpart application No. 2010-282708 with English translation.

* cited by examiner

*Primary Examiner* — Omar Rojas
(74) *Attorney, Agent, or Firm* — Kratz, Quintos & Hanson, LLP (57) ABSTRACT

A two-layer optical waveguide includes a core layer having a first surface and a second surface opposite to the first surface, and a cladding layer laminated on the first surface of the core layer. The two-layer optical waveguide further includes a mirror structure provided at a plurality of positions on the first surface of the core layer, the mirror structure directing a light signal which travels in the core layer, toward the second surface of the core layer. Each mirror structure includes an inclined plane formed on the first surface of the core layer, and a metal film formed on the inclined plane.

3 Claims, 9 Drawing Sheets

TWO-LAYER OPTICAL WAVEGUIDE AND METHOD OF MANUFACTURING THE SAME

CROSS-REFERENCE TO RELATED APPLICATION

This application is based upon and claims the benefit of priority of the prior Japanese Patent Application No. 2010-282708, filed on Dec. 20, 2010, the entire contents of which are incorporated herein by reference.

FIELD

The embodiments discussed herein are related to a two-layer optical waveguide and a method of manufacturing the same. Such a two-layer optical waveguide is used, for example, with being mounted together with an optical device on an electrical wiring board.

BACKGROUND

As one form of an optical waveguide, there is a three-layer structure in which cladding layers are laminated on both surfaces of a core layer, respectively. A process of fabricating such an optical waveguide includes a step of laminating and curing a first cladding layer, a step of laminating and patterning a core layer, and a step of laminating and curing a second cladding layer. Namely, the process needs three steps.

Where such an optical waveguide is mounted together with an optical device on an electrical wiring board, it is necessary to form a mirror structure for optically coupling to the optical device in the optical waveguide after laminating the above three layers. The mirror structure is obtained by forming a V-shaped groove (inclined plane) so as to penetrate the second cladding layer and reach the core layer, and forming a metal film on the inclined plane. Namely, the mirror structure is formed not only in a portion of the core layer, but also in a portion of the cladding layer.

As the art related to fabrication of such an optical waveguide of three-layer structure, for example, there is known an optical waveguide apparatus and a manufacturing method thereof described in Patent document 1 (Japanese Laid-open Patent Publication No. 2000-199827). As another art, there is known a manufacturing method of an optical waveguide described in Patent document 2 (Japanese Patent No. 2598025). Moreover, there is known a manufacturing method of an optical/electrical hybrid board described in Patent document 3 (Japanese Laid-open Patent Publication No. 2005-300930).

As described above, the process of fabricating an optical waveguide of three-layer structure needs three steps of laminating a first cladding layer, a core layer and a second cladding layer. Accordingly, the period needed for manufacture becomes relatively long, and thus it is disadvantageous in cost.

Moreover, the distance between the mirror portion formed in the optical waveguide and the light emitting/receiving plane of an optical device to be coupled to the optical waveguide becomes relatively long by the thickness of the cladding layer. As a result, the optical loss is increased and thus the optical characteristics are deteriorated.

Moreover, since the mirror structure is formed after lamination of the three layers, part of the mirror structure is formed in a portion of the cladding layer. However, it is essentially not necessary to form the mirror structure in the portion of the cladding layer. As a result, a light is reflected on the portion of the cladding layer (other than the necessary portion), and thus there is a possibility of occurrence of undesirable crosstalk noises and the like.

SUMMARY

According to one aspect of the invention, there is provided a two-layer optical waveguide including a core layer having a first surface and a second surface opposite to the first surface, a cladding layer laminated on the first surface of the core layer, and a mirror structure provided at a plurality of positions on the first surface of the core layer, each mirror structure directing a light signal which travels in the core layer, toward the second surface of the core layer.

According to another aspect of the invention, there is provided a method of manufacturing a two-layer optical waveguide, including: forming a core layer on a base plate by patterning; forming a mirror structure at a plurality of positions on the core layer, the mirror structure directing a light signal which travels in the core layer, toward the base plate; forming a cladding layer on the core layer; and removing the base plate.

The object and advantages of the invention will be realized and attained by means of the elements and combination particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings.

FIGS. 1A to 7B illustrate a method of manufacturing a two-layer optical waveguide according to an embodiment, according to the order of steps. FIGS. 1A,2A,3A,4A,5A,6A and 7A are plan views when observing the object to be processed in the step concerned from the top side, respectively, and FIGS. 1B,2B,3B,4B,5B,6B and 7B are cross-sectional view when taken along the line A-A depicted in FIGS. 1A,2A, 3A,4A,5A,6A and 7A, respectively. The two-layer optical waveguide according to this embodiment is used with being mounted together with an optical device on an electrical wiring board, as described later.

First, the constitution of the two-layer optical waveguide according to this embodiment will be explained. As illustrated in FIG. 7B, the two-layer optical waveguide 10 of the embodiment has a structure in which a core layer 12 and a cladding layer 18 are laminated. More specifically, the cladding layer 18 is formed to surround one surface (upper side in the illustrated example) and the side surface of the core layer 12. The other surface (lower side in the illustrated example) of the core layer 12 is exposed and is on a level with the lower surface of the cladding layer 18. In the description below, the one surface of the core layer 12 which is in contact with the cladding layer 18 is referred to as a "first surface 12a", for the sake of convenience, and the other surface (exposed surface) opposite to the first surface 12a is referred to as a "second surface 12b".

The core layer 12 is made of a material through which a light can pass, and is basically formed of the same material as the cladding layer 18. For example, acrylic resin such as polymethyl mathacrylate (PMMA), epoxy resin, polyimide resin, silicone resin and the like can be used. Note, it is necessary for a light signal to be propagated only in the core layer 12. To this end, the refractive index of a material constituting the core layer 12 is selected to be higher than that of a medium in contact with both surfaces of the core layer 12 (the cladding layer 18 on the first surface 12a, the air on the second surface 12b).

Figure 7A:
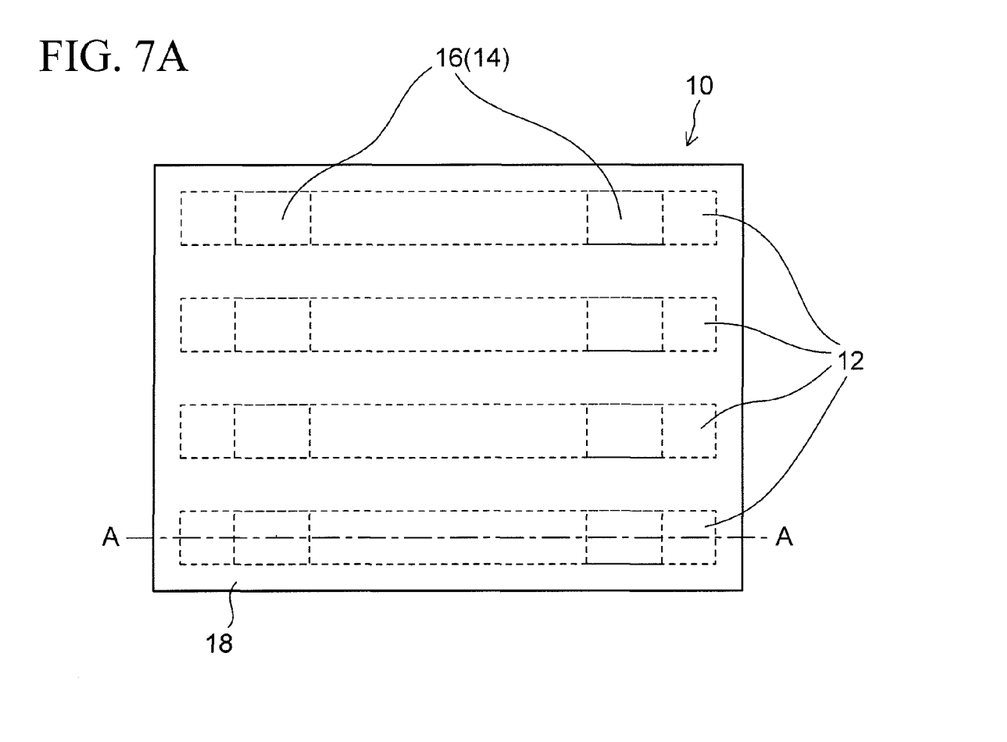
FIGS. 7A and 7B are views illustrating manufacturing steps subsequent to the steps of FIGS. 6A and 6B.
Figure 7B:
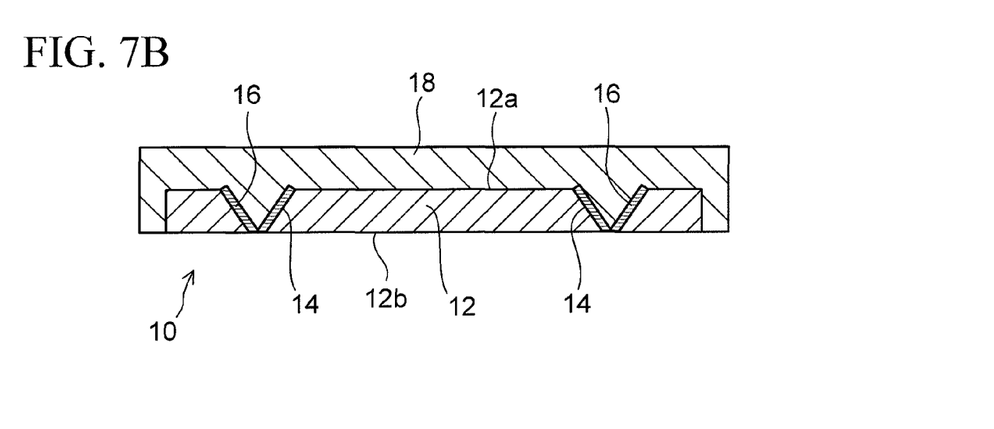

The core layer 12 is formed in a linear pattern, as illustrated in FIG. 7A. In the illustrated example, the core layer 12 includes four patterns parallel with each other, but this is one example. It is of course that the shape and the number of patterns are not restricted to the illustrated example.

The core layer (linear pattern) 12 is provided with a groove (inclined plane) 14 which exhibits the shape of "V" when viewed in cross section. The V-shaped groove (inclined plane) 14 is formed at two positions near the both ends of each linear pattern on the first surface 12a of the core layer 12. Moreover, a metal film 16 functioning as a mirror for optical path conversion is formed on the inclined plane 14. The V-shaped groove (inclined plane) 14 is formed with the angle of 45 degrees with respect to the direction of travel of a light which is propagated in the core layer 12. The position of the V-shaped groove (inclined plane) 14 is selected at a position which faces the light emitting plane or the light receiving plane of an optical device when the optical device is mounted together with the two-layer optical waveguide 10 on an electrical wiring board, as described later.

According to this structure, a light which is propagated in the core layer 12 of the two-layer optical waveguide 10 is reflected on the metal film (mirror) 16 formed on the inclined plane 14 toward a direction perpendicular to the second surface 12b of the core layer 12, and thus the light is emitted from the second surface 12b of the core layer 12. The emitted light is received on the light receiving plane of an optical device. On the other hand, a light emitted from the light emitting plane of another optical device is entered into the second surface 12b of the core layer 12, and is reflected on the metal film (mirror) 16 formed on the inclined plane 14 toward a direction parallel with the second surface 12b of the core layer 12. Thus the light is propagated in the core layer 12.

Next, a method of manufacturing the two-layer optical waveguide 10 according to the embodiment will be explained with reference to FIGS. 1A to 7B, which illustrate an example of the method.

In the initial step (FIGS. 1A and 1B), a substrate (base plate 2) as a support member is first prepared, and the core layer 12 is then formed by patterning into a required shape on the base plate 2. In the example illustrated in FIG. 1A, the core layer 12 is formed to include four linear patterns parallel each other. The thickness t of each pattern (core layer 12) is selected, for example, to be approximately 30 to 80 μm, and the width W of each pattern (core layer 12) is also selected to be approximately 30 to 80 μm.

As a material for the base plate 2, for example, acrylic resin, polycarbonate resin or the like can be used. As a material for the core layer 12, it is sufficient for a light to be capable of travelling in the core layer 12, and basically the same material as the cladding layer 18 (FIGS. 6A and 6B) described later is used. Note, since it is necessary for a light signal to be propagated only in the core layer 12, the material with which appropriate additives are mixed is used so that the refractive index of the core layer 12 is higher than that of the medium in contact with both surfaces of the core layer 12 (the cladding layer 18 on the first surface 12a, the air on the second surface 12b).

Figure 1A:
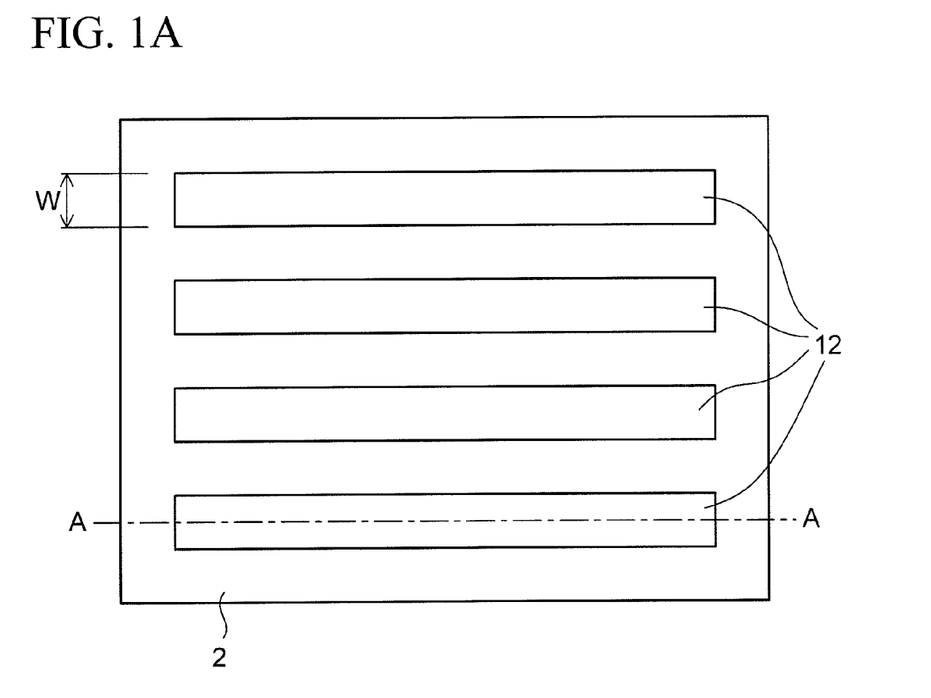
FIGS. 1A and 1B are views illustrating manufacturing steps of a two-layer optical waveguide according to an embodiment.
Figure 1B:
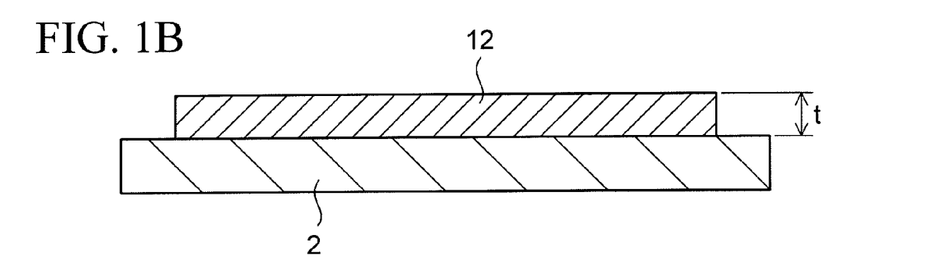

As the material for the core layer 12, for example, an ultraviolet (UV) curing type resin can be used. The UV curing type resin includes modified acrylate (epoxy resin, polyester resin and the like) as a base resin, and further includes reactive acrylic monomer needed for photopolymerization, agent for starting photopolymerization and additives. The primary reaction is radical polymerization. Use of the UV curing type resin is advantageous in that it can be treated under the normal temperature. Moreover, the UV curing type resin is cured in a short time compared with use of a thermosetting type resin, and thus it is possible to reduce working hours. The form of the UV curing type resin to be used may be a film, or may be a liquid.

The core layer 12 of a required pattern can be formed by using the UV curing type resin to form the layer on the base plate 2 and then performing a patterning of the layer (exposure and development) according to the shape of the required pattern (in the example illustrated in FIG. 1A, four linear patterns parallel with each other).

In the next step (FIGS. 2A and 2B), a dicing tape 4 is attached to the surface of the base plate 2 on the side opposite to the side on which the core layer 12 is formed. The dicing tape 4 is used when dividing into the individual products (in this case, two-layer optical waveguides) at a later step if necessary.

Figure 2A:
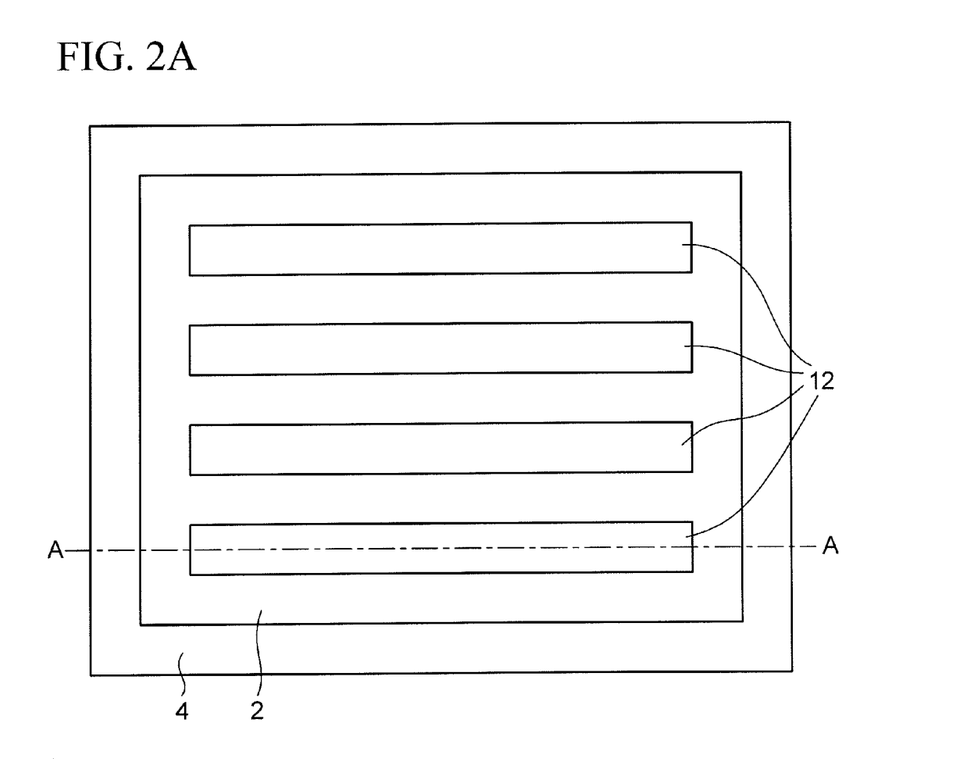
FIGS. 2A and 2B are views illustrating manufacturing steps subsequent to the steps of FIGS. 1A and 1B.
Figure 2B:
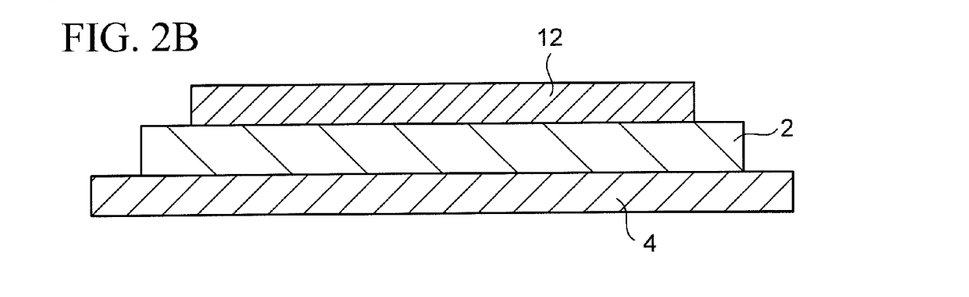

As a material for the dicing tape 4 and the form thereof, for example, a base film made of resin such as PVC (polyvinyl chloride), PO (polyolefin), PET (polyethylene terephthalate) or the like can be used with an adhesive made of acrylic-based resin or the like being coated on one surface of the base film. The dicing tape 4 is eventually removed. Accordingly, in order to facilitate the removal, a tape of the type in which adhesion is lowered by UV irradiation can be preferably used.

In the next step (FIGS. 3A and 3B), the V-shaped groove (inclined plane) 14 is formed on the core layer (linear pattern) 12 on the base plate 2 fixed on the dicing tape 4, at two positions near the both ends of each linear pattern, by bevel cutting with a blade. For example, the inclined plane (V-shaped groove) 14 can be formed with the angle of 45 degrees relative to the upper surface of the core layer 12 by cutting so as to cross each linear pattern (core layer 12) with a dicing blade having an included angle of 90 degrees.

Figure 3A:
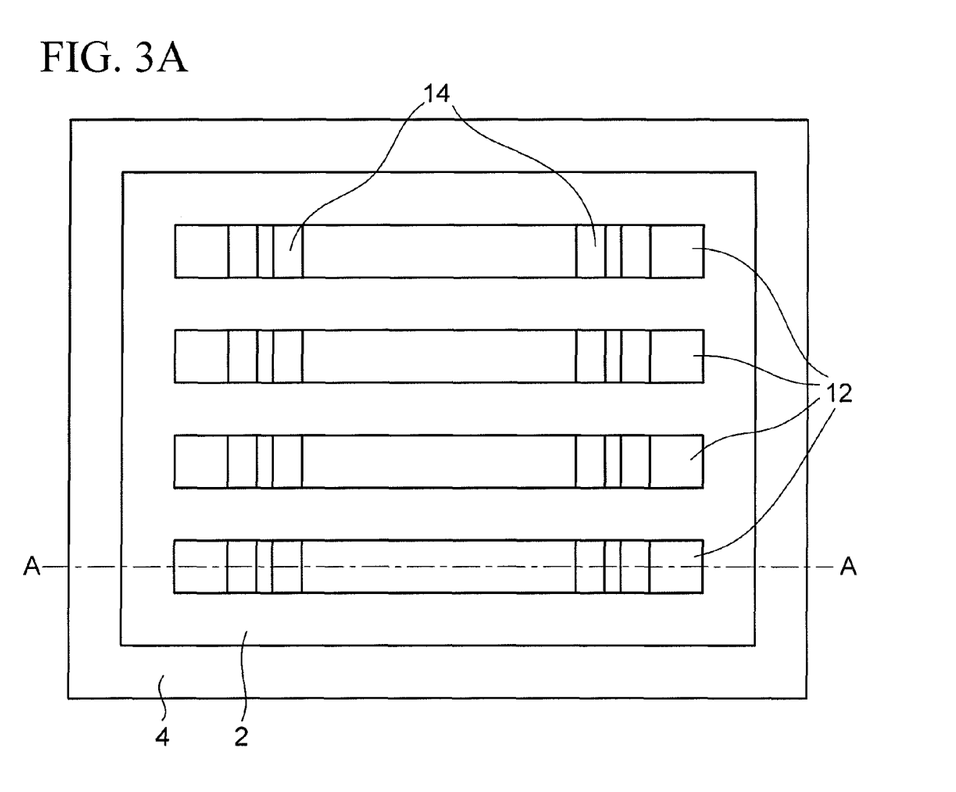
FIGS. 3A and 3B are views illustrating manufacturing steps subsequent to the steps of FIGS. 2A and 2B.
Figure 3B:
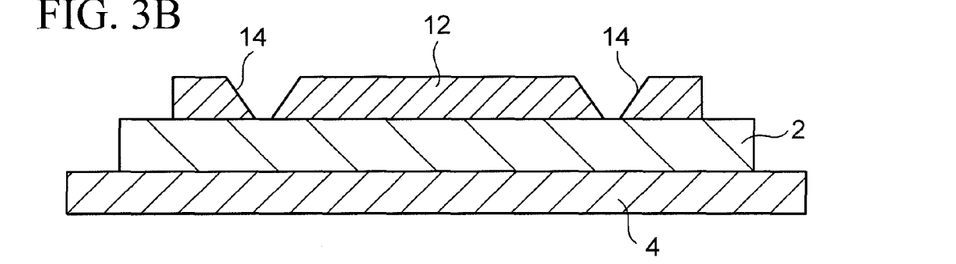

Alternatively, the inclined plane having the angle of 45 degrees may be formed with abrasion by an excimer laser or the like, so as to cross the predetermined positions of the core layer 12 (two positions of each linear pattern).

The position of the V-shaped groove (inclined plane) 14 is selected at a position which faces the light emitting plane or the light receiving plane of an optical device when mounting the optical device together with the two-layer optical waveguide 10 on an electrical wiring board, as described later.

In the next step (FIGS. 4A and 4B), a mask 6 is disposed on the core layer 12 on which the V-shaped groove (inclined plane) 14 is formed. The mask 6 is patterned so as to have an opening portion OP at a position thereof corresponding to the inclined plane 14.

Figure 4A:
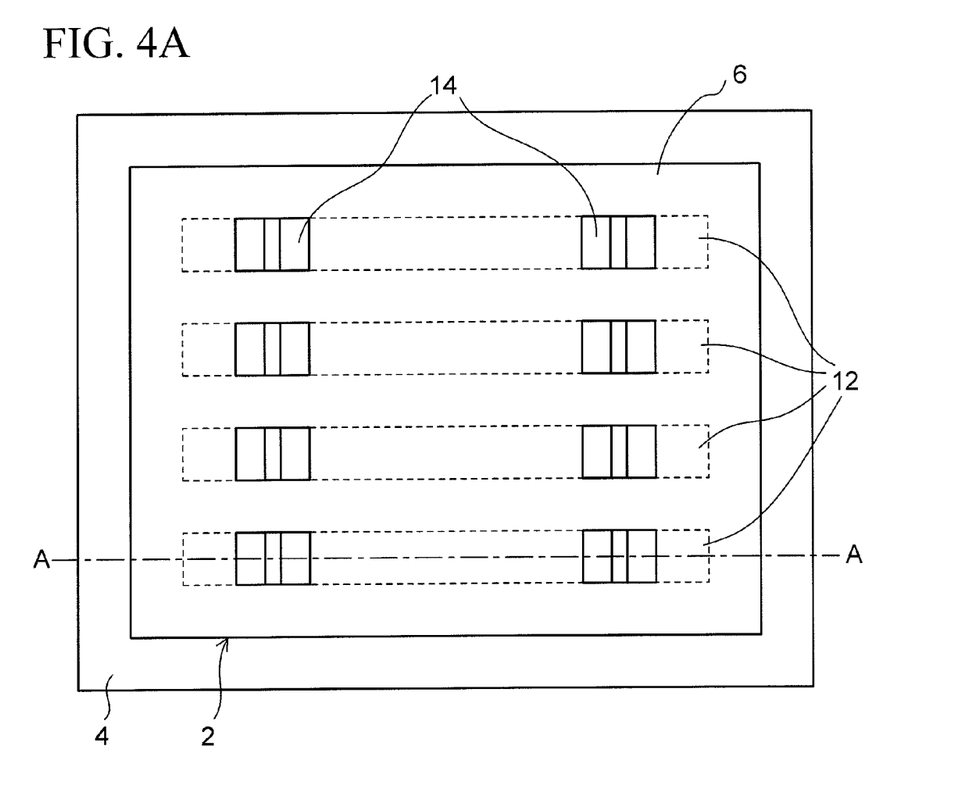
FIGS. 4A and 4B are views illustrating manufacturing steps subsequent to the steps of FIGS. 3A and 3B.
Figure 4B:
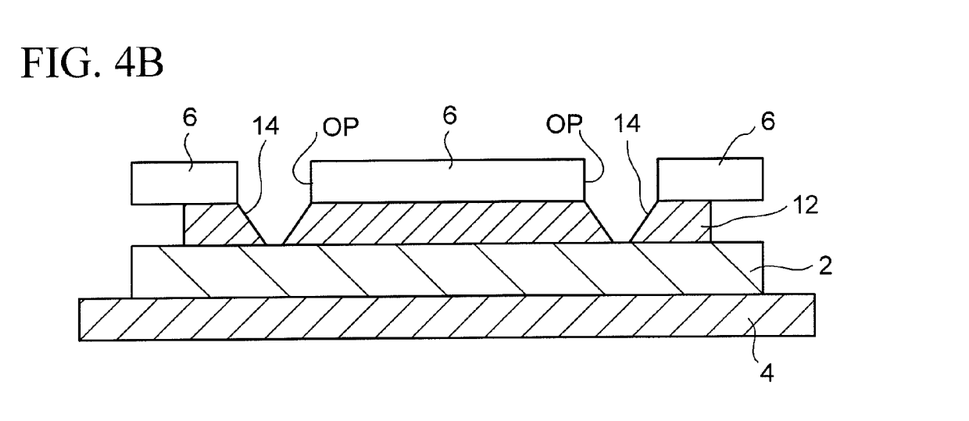
Figure 5A:
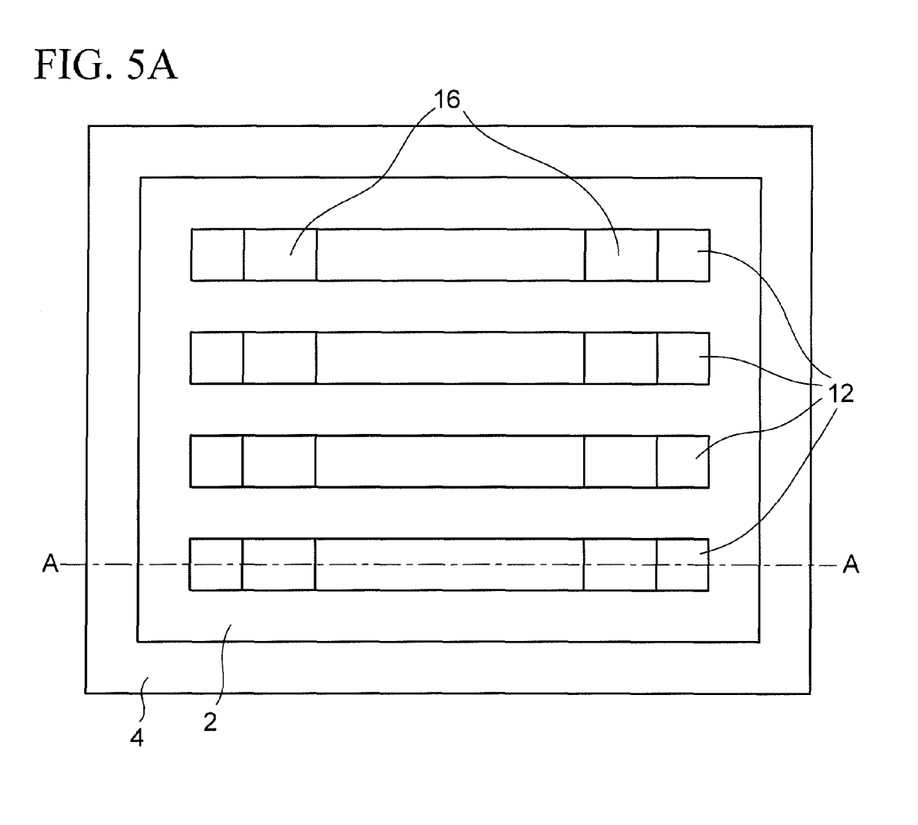
FIGS. 5A and 5B are views illustrating manufacturing steps subsequent to the steps of FIGS. 4A and 4B.
Figure 5B:
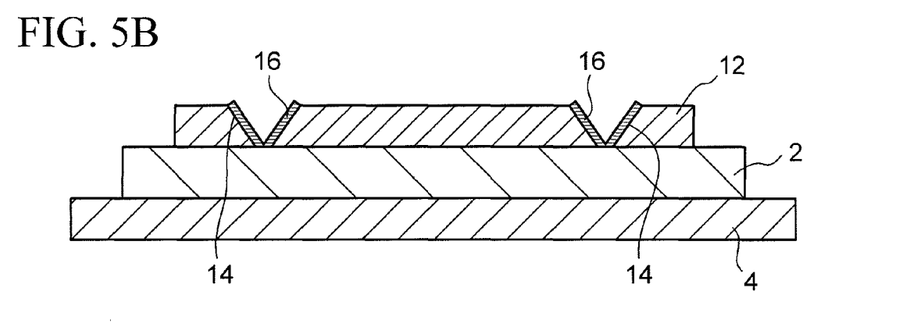

As a result, the core layer 12 is covered by the mask 6 and only the portion thereof corresponding to the V-shaped groove (inclined plane) 14 is exposed.

In the next step (FIGS. 5A and 5B), the metal film (mirror) 16 which is lustrous and made of gold (Au), silver (Ag) or the like, is formed by vacuum deposition, sputtering or the like, on the inclined plane 14 of the core layer 12, which is exposed through the opening portion OP of the mask 6. The metal film 16 together with the inclined plane 14 constitutes the mirror structure.

After the formation of the metal film (mirror) 16, the mask 6 (FIGS. 4A and 4B) is removed.

In the next step (FIGS. 6A and 6B), the cladding layer 18 is formed with a required thickness (approximately the same thickness as the core layer 12) so as to cover the entire core layer 12 on the base plate 2. Namely, the cladding layer 18 is formed to surround one surface (the surface on which the metal film (mirror) 16 is formed) and the side surface of the core layer 12. As a result, the other surface of the core layer 12 is positioned on the same surface as the lower surface of the cladding layer 18.

Figure 6A:
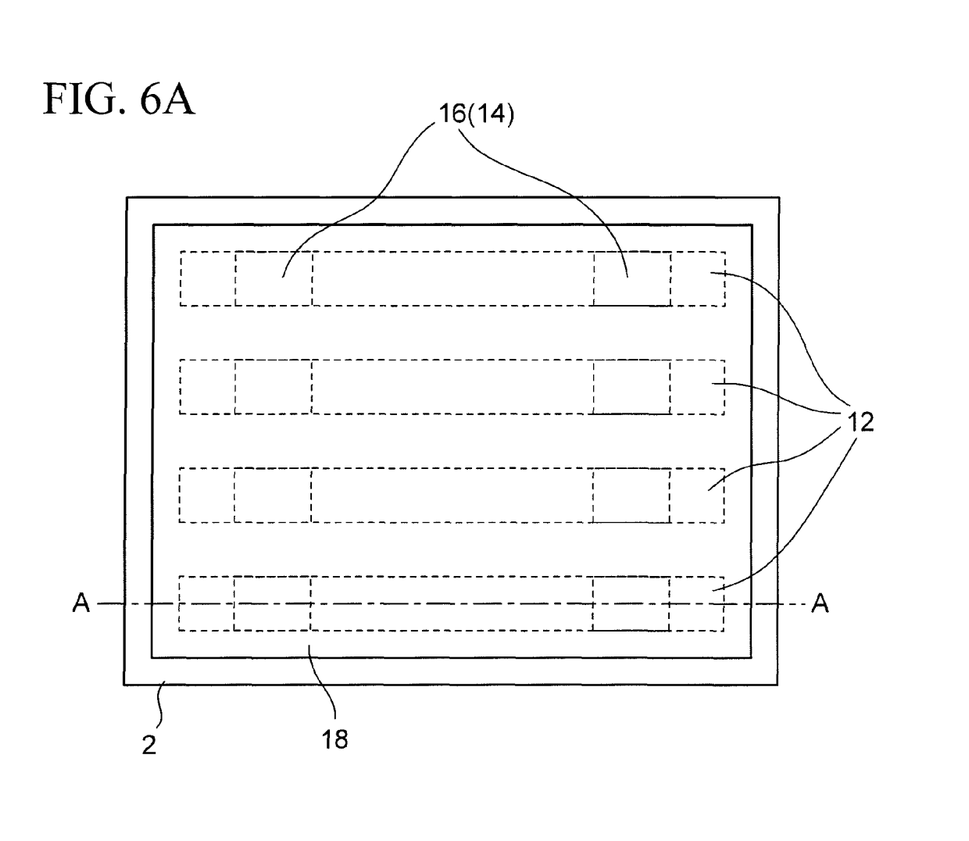
FIGS. 6A and 6B are views illustrating manufacturing steps subsequent to the steps of FIGS. 5A and 5B.
Figure 6B:
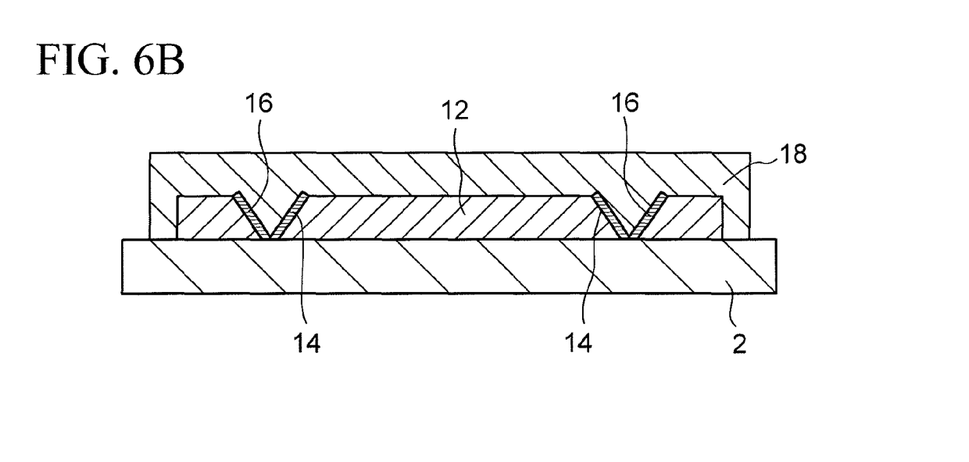

As the material for the cladding layer 18, basically the same UV curing type resin as that of the core layer 12 can be used, as described above. Note it is necessary to suitably select the material so that the refractive index thereof is lower than that of the core layer 12.

At the stage of the cladding layer 18 being formed, the structure of the two-layer optical waveguide 10 (see FIGS. 7A and 7B) is basically completed. This structure is divided on the dicing tape 4 (see FIGS. 5A and 5B), into the individual products (two-layer optical waveguides) with a dicer or the like. As a result, the respective products are brought to a state separated from one another, with the core layer 12 being attached via the base plate 2 onto the dicing tape 4.

Then the dicing tape 4 is removed. Where the dicing tape 4 is of the type in which adhesion is lowered by UV irradiation, it can be easily removed by UV irradiation.

In the final step (FIGS. 7A and 7B), the base plate 2 is removed. Thus the two-layer optical waveguide 10 of the embodiment is manufactured.

As described above, according to the two-layer optical waveguide 10 and the manufacturing method thereof of the present embodiment (FIGS. 1A to 7B), the second surface 12b of the core layer 12 (the surface on the opposite side to the side on which the cladding layer 18 is formed) is exposed. Namely, on the second surface 12b, there is no cladding layer which corresponds to one of the two cladding layers constituting an ordinary optical waveguide of three-layer structure. Accordingly, when an optical device is coupled to the two-layer optical waveguide 10, the distance between the mirror 16 provided in the core layer 12 and the light emitting/receiving plane of the optical device becomes relatively short. As a result, the optical loss is reduced and thus the optical characteristics can be improved.

Moreover, one cladding layer becomes unnecessary, which corresponds to one of the two cladding layers constituting an ordinary optical waveguide of three-layer structure. Accordingly, when manufacturing the two-layer optical waveguide 10, it is possible to omit a step of forming the unnecessary cladding layer. As a result, it is possible to reduce the period needed for manufacture and thus to contribute to a reduction in the manufacturing cost.

Moreover, the mirror 16 (inclined plane 14) is formed only in a portion of the core layer 12, which is essentially the necessary portion. Accordingly, a reflection of light on the portion other than the necessary portion, such as encountered in the optical waveguide of three-layer structure, does not occur, and thus it is possible to prevent crosstalk noises and the like.

Figure 8:
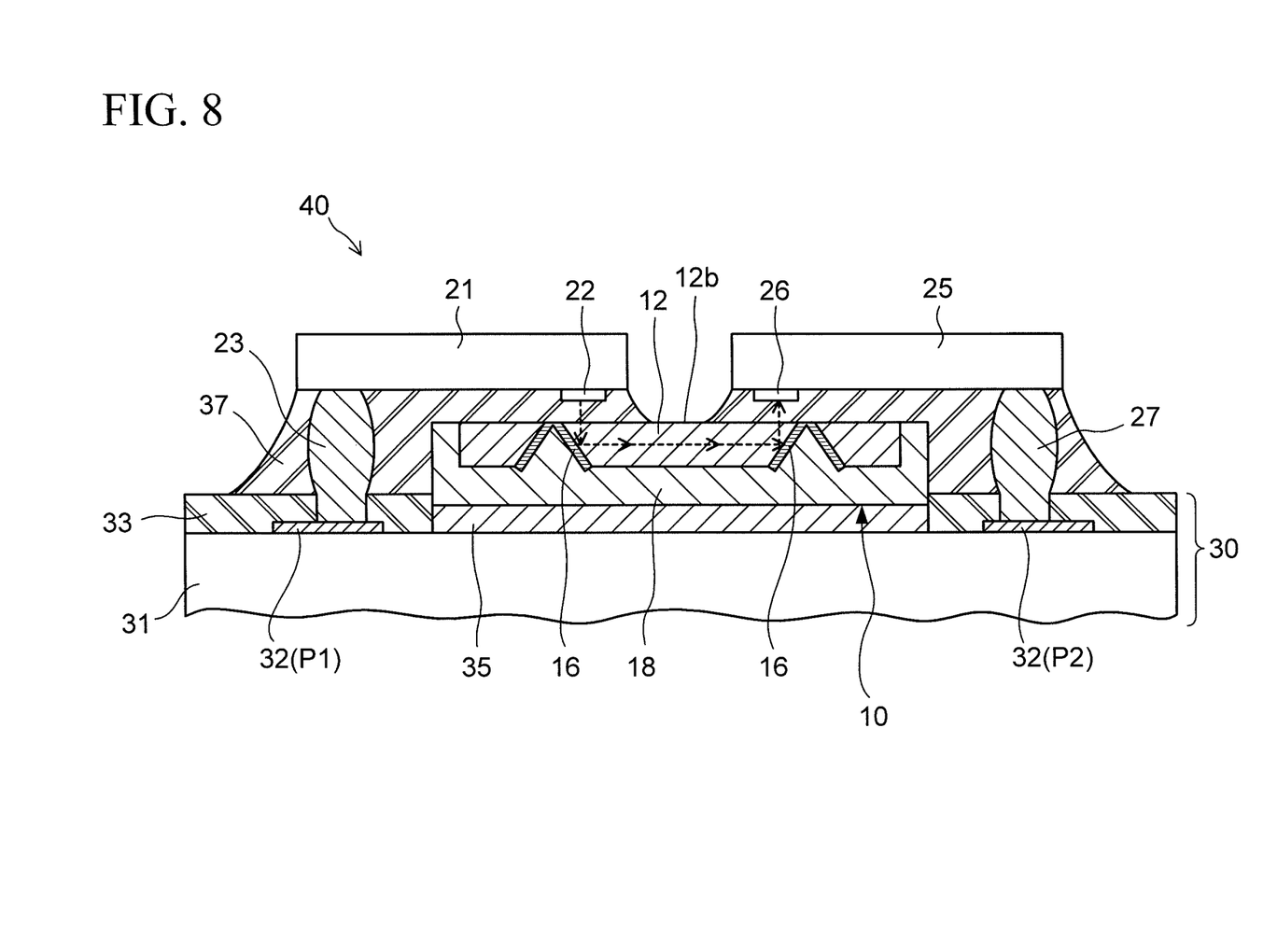
FIG. 8 is a cross-sectional view illustrating an example of the state (mounted structure) where the two-layer optical waveguide according to the embodiment is mounted together with an optical device on an electrical wiring board.

FIG. 8 illustrates in a cross-sectional view, an example of the state (mounted structure) where the two-layer optical waveguide 10 according to the above embodiment is mounted together with an optical device on an electrical wiring board.

The electrical wiring board 30 used in the mounted structure 40 illustrated in FIG. 8 is not restricted to any special form. For example, a resin substrate such as used in an ordinary plastic package can be used. In FIG. 8, reference numeral 31 denotes a resin substrate which constitutes the body of wiring board, and wiring layers 32 patterned into a required shape are formed on both surfaces of the resin substrate 31. Note, only the wiring layer 32 on the upper side of the resin substrate 31 is illustrated, and as for the wiring layer 32 on the lower side thereof, the illustration is omitted.

As the form of the resin substrate 31, it is sufficient to be a substrate in which the wiring layers 32 are formed at least on both surfaces of the substrate and they are electrically connected to each other through the inside of the substrate. For example, a wiring board of multilayer structure using a build-up method can be used. This is obtained by sequentially repeating, on both surfaces of a core substrate (e.g., glass cloth base epoxy resin copper clad laminate), the steps of forming an insulating layer (resin layer composed of epoxy-based resin or the like), forming a via hole in the insulating layer, and forming a wiring pattern inclusive of the inside of the via hole (typically a wiring layer by copper (Cu) plating). The outermost wiring layers 32 of the resin substrate 31 thus formed are electrically connected to each other via internal wiring layers formed in the substrate and via holes (conductors filled therein) interconnecting the internal wiring layers.

Moreover, pads P1 and P2 are defined at required positions on the wiring layer 32, and a solder resist layer 33 as a protection film is formed to cover the wiring layer 32 with the pads P1 and P2 being exposed (electrical wiring board 30).

As optical devices to be mounted on the electrical wiring board 30, for example, a light emitting element such as VCSEL (Vertical Cavity Surface Emitting Laser), LED (light emitting diode) or the like, and a light receiving element such as PD (photodiode), APD (avalanche photodiode) or the like, can be mounted. In the illustration of FIG. 8, two optical devices 21, 25 are mounted on the electrical wiring board 30. One optical device (on the left side) is a light emitting element 21 and the other optical device (on the right side) is a light receiving element 25. Although not illustrated in FIG. 8, an electronic device such as a semiconductor element (IC chip) can also be mounted on the electrical wiring board 30 when necessary. For example, an IC chip such as a driver for the light emitting element 21, an IC chip such as a DSP (digital signal processor) for processing a light signal output from the light receiving element 25, an amplifier or the like, can be mounted.

Moreover, the two-layer optical waveguide 10 is provided in a region on the electrical wiring board 30, which extends over the light emitting element 21 and the light receiving element 25. More specifically, the two-layer optical waveguide 10 is mounted with an adhesive layer 35 (e.g., photo-curing type resin or thermosetting type resin composed of glass-epoxy resin or the like) being interposed between the resin substrate 31 and the surface side on which the cladding layer 18 is formed. Namely, the two-layer optical waveguide 10 is mounted with the surface side on which the core layer 12 is formed, being directed upside, and a portion of the second surface 12b of the core layer 12 is exposed.

As for the order of mounting, the two-layer optical waveguide 10 is first mounted on the electrical wiring board 30, and the optical devices 21 and 25 are then mounted on the electrical wiring board 30. Furthermore, an underfill resin 37 is filled between the mounted optical devices 21, 25 and the electrical wiring board 30, and cured.

The light emitting element 21 has a light emitting plane 22 and an electrode pad (not illustrated) on the surface on the side which faces the core layer 12 of the two-layer optical waveguide 10. Similarly, the light receiving element 25 has a light receiving plane 26 and an electrode pad (not illustrated) on the surface on the side which faces the core layer 12 of the two-layer optical waveguide 10. Conductors 23 and 27 such as solder bumps used as electrode terminals when mounted on the electrical wiring board 30, are joined onto the respective electrode pads of the elements 21 and 25. Each element 21, 25 is electrically connected via each conductor 23, 27 to the corresponding pad P1, P2 on the resin substrate 31. Each pad P1, P2 is connected to each other via internal wiring layers (not illustrated) of the resin substrate 31. Namely, the light emitting element 21 and the light receiving element 25 are electrically connected to each other via the conductors 23, 27, the pads P1, P2 and the internal wiring layers.

Moreover, a light emitted from the light emitting plane 22 of the light emitting element 21 is transmitted through the resin layer 37, as indicated by an arrow of broken line in FIG. 8, and is entered into the core layer 12 of the two-layer optical waveguide 10. The entered light is then reflected on the metal film 16 formed on the V-shaped groove provided at one end side (left side) of the core layer 12, and is propagated in the core layer 12. On the other hand, a light which is propagated in the core layer 12 is reflected on the metal film 16 formed on the V-shaped groove provided at the other end side (right side) of the core layer 12, and is emitted from the core layer 12. The emitted light is then transmitted through the resin layer 37, and is received on the light receiving plane 26 of the light receiving element 25.

Figure 9:
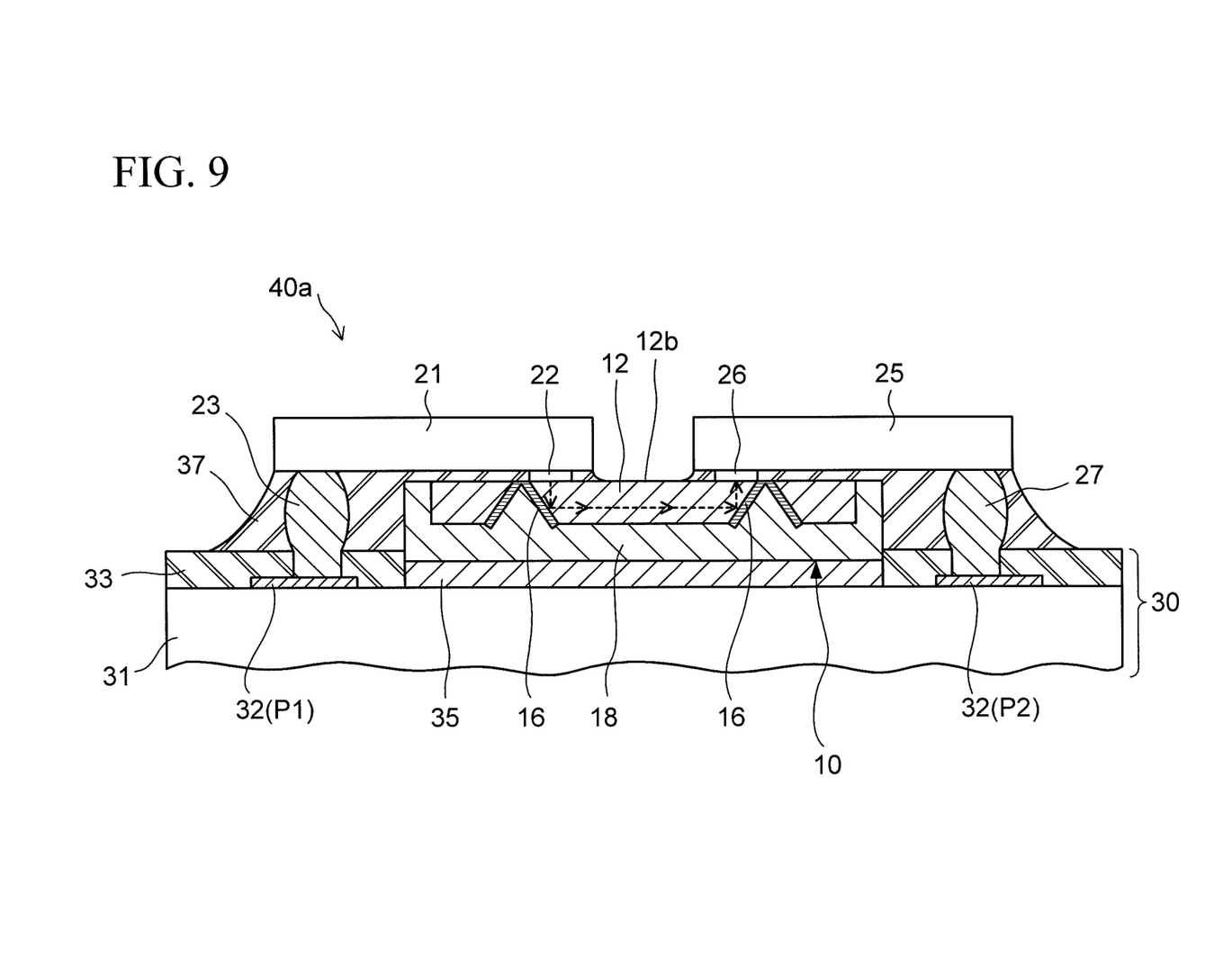
FIG. 9 is a cross-sectional view illustrating another example of the state (mounted structure) where the two-layer optical waveguide according to the embodiment is mounted together with an optical device on an electrical wiring board.

FIG. 9 illustrates in a cross-sectional view, another example of the state (mounted structure) where the two-layer optical waveguide 10 according to the above embodiment is mounted together with an optical device on an electrical wiring board.

The mounted structure 40a illustrated in FIG. 9 is different from the mounted structure 40 illustrated in FIG. 8 in that the optical devices (light emitting element 21, light receiving element 25) are directly coupled to the two-layer optical waveguide 10 without the resin layer 37 being optically interposed therebetween. Namely, the light emitting plane 22 of the light emitting element 21 and the light receiving plane 26 of the light receiving element 25 are in contact with the core layer 12 (the second surface 12b) of the two-layer optical waveguide 10, respectively. The other configuration and the relationship of engagement are the same as those in the mounted structure 40 in FIG. 8, and thus the explanation is omitted.

According to the mounted structure 40a illustrated in FIG. 9, the distance between the light emitting/receiving plane 22, 26 of each optical device 21,25 and the corresponding mirror 16 becomes relatively short, compared with the mounted structure 40 illustrated in FIG. 8. This results in a further reduction in the optical loss and thus contributes to a further improvement in the optical characteristics.

With respect to the constitution of the two-layer optical waveguide 10 (FIGS. 7A and 7B) according to the above embodiment, the explanation is given of the case where the core layer 12 is formed in a linear pattern and the mirror structure (the V-shaped groove 14 and the metal film 16) is provided at two positions near the both ends of each linear pattern. It is of course, however, that disposition of the mirror structure is not restricted to the two positions depending upon the shape of the pattern forming the core layer 12. For example, where the pattern is branched into two directions on the way from one end to another end of the core layer 12, the mirror structure is provided at three positions, i.e., one position near the one end and two positions near the another end.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A two-layer optical waveguide, comprising:
   a core layer having a first surface and a second surface opposite to the first surface;
   a cladding layer laminated on the first surface of the core layer; and
   a mirror structure provided at a plurality of positions at the first surface of the core layer, each mirror structure directing a light signal which travels in the core layer, toward the second surface of the core layer, the mirror structure including an inclined plane of a concave part formed at the first surface of the core layer, and a metal film formed on the inclined plane, wherein the concave part of the mirror structure having the inclined plane is filled with the cladding layer, and
   wherein the cladding layer is formed to surround the first surface and a side surface of the core layer, and the second surface of the core layer is exposed and is on a level with a face of the cladding layer located to the second surface side of the core layer.

2. A method of manufacturing a two-layer optical waveguide, comprising:
   forming a core layer on a base plate by patterning;
   forming a mirror structure at a plurality of positions on the core layer, by forming an inclined plane at each of the plurality of position on the core layer, and disposing a mask on the core layer with each inclined plane being exposed, and forming a metal film on each inclined plane, the mirror structure directing a light signal which travels in the core layer, toward the base plate;
   forming a cladding layer on the core layer, wherein the inclined plane is filled with the cladding layer, and the cladding layer is formed to surround an upper surface and a side surface of the core layer; and
   removing the base plate,
   wherein a lower surface of the core layer is exposed and is on a level with a lower surface face of the cladding layer.

3. The method of manufacturing a two-layer optical waveguide, according to claim 2, wherein the core layer and the cladding layer are formed using an ultraviolet curing type resin.

* * * * *